United States Patent
Schuster et al.

(10) Patent No.: US 6,689,269 B1
(45) Date of Patent: Feb. 10, 2004

(54) METHOD FOR ELECTROCHEMICALLY PROCESSING MATERIAL

(75) Inventors: Rolf Schuster, Berlin (DE); Viola Kirchner, Berlin (DE)

(73) Assignee: Max-Planck-Gesellschaft zur Forderung der Wissenschaften E.V., Munich (DE)

( * ) Notice: Subject to any disclaimer, the term of this patent is extended or adjusted under 35 U.S.C. 154(b) by 0 days.

(21) Appl. No.: 09/868,627

(22) PCT Filed: Dec. 27, 1999

(86) PCT No.: PCT/DE99/04122

§ 371 (c)(1),
(2), (4) Date: Jun. 26, 2001

(87) PCT Pub. No.: WO00/40362

PCT Pub. Date: Jul. 13, 2000

(30) Foreign Application Priority Data

Jan. 5, 1999 (DE) .......................... 199 00 173

(51) Int. Cl.⁷ .................. C25D 5/02; C25D 5/04; C25D 5/18; C25F 3/02; C25F 3/14
(52) U.S. Cl. .................. 205/642; 205/644; 205/652; 205/136; 204/224 R; 204/224 M; 204/229.3; 204/230.6
(58) Field of Search .................. 204/224 R, 224 M, 204/228.1, 229.3, 230.1, 203.6; 205/118, 136, 640, 642, 644, 646, 652

(56) References Cited

U.S. PATENT DOCUMENTS 4,097,710 A 6/1978 Maillet

FOREIGN PATENT DOCUMENTS

EP 0422248 4/1991
WO 97/03781 2/1997

OTHER PUBLICATIONS

"Nanoscale Electrochemistry", Schuster et al, Physical Review Letter, vol. 80, No. 25, Jun. 22, 1998.

"Scanning Electrochemical Microscopy", Bard et al, Electroanalytical Chemistry, vol. 18, 1994, pp. 243–373.

*Primary Examiner*—Roy King
*Assistant Examiner*—Harry D. Wilkins, III
(74) *Attorney, Agent, or Firm*—Dennison, Schultz & Dougherty

(57) ABSTRACT

The invention relates to a method for electrochemically processing a workpiece (61) in which a pulsating or alternating electrical voltage is applied between the workpiece and a workpiece electrode (62) which are arranged at a distance from one another in an electrolyte. A distance range is defined by precisely dimensioning the mean value of the applied pulsating voltage and of the voltage amplitudes measured with regard to this mean value. A double layer charge reversal on the workpiece which is sufficient for bringing about the desired electrochemical reaction results within said distance range, whereas workpiece areas situated at further distances do not experience a sufficient double layer charge reversal. The dimensions of the space between the workpiece and the workpiece electrode are proportioned in such a way that only points of the area of the workpiece to be processed lie within said distance range. As a result, it is possible to attain a spatial resolution that could not be obtained until now during the production of the smallest three-dimensional structures.

18 Claims, 14 Drawing Sheets

(a)

(b)

(a) with 0.1 M electrolyte (b) with 0.03 M eletrolyte

Pulse duration 400 ns

METHOD FOR ELECTROCHEMICALLY PROCESSING MATERIAL

BACKGROUND OF THE INVENTION

The invention relates to a method for electrochemically processing a workpiece by means of a pulsating or alternating electrical voltage. A particular area of application for the invention is the removal or deposition of material on a workpiece surface to produce fine structures in the micrometer or sub-micrometer range.

It is possible to produce structures in the μm range by means of mechanical cutting methods such as turning, boring and milling using suitable tools, such as for example diamond cutting tools. In the case of hard alloys and sinter metals where it is not possible to use the metal-cutting deformation method it is possible to achieve dimensional accuracy of a few μm by spark erosion and laser processing.

The smallest structures of some nm in size and dimensional accuracy are achieved using photo-lithographic techniques which are preferably used to produce semi-conductor chips and also to form synthetic material moulds and silicon moulds for micro-teeth wheels and motors. However, the corresponding structures which are obtained by means of anisotropic etching are always dependent upon the crystallographic directions of the substrate.

Electrochemical methods for material processing are known in various embodiments but owing to their limited precision they have hitherto only been used to a small extent. In the case of conventional methods a direct voltage is applied between two electrodes which are immersed in an electrolyte and of which one forms the workpiece and the other the tool. The local current density and thus also the removal and deposition rate are only slightly influenced by the shape of the electrodes. For this reason, the electrochemical reaction also always occurs in electrode regions which are greatly distanced from the actual site to be processed. This sets limits for the achievable accuracy or spatial resolution of the structure produced.

In the case of conventional electrochemical boring, the cathode is lowered into the workpiece and a working gap of 0.05 to 2 mm is formed depending upon the feed rate and current density. The precision which can be achieved is determined in this case by the current density and is therefore relatively low; the smallest achievable edge radius is approx. 0.1 mm. The same also applies for the known electrochemical turning/boring process with the aid of a capillary which is filled with electrolyte and which is used in place of an electrode which is moved against the workpiece in order to direct the reaction current locally to the site to be processed.

An electrochemical processing method which is described as "Scanning Electrochemical Microscopy" and is intended to render it possible to produce the smallest two-dimensional structures of a few 100 nm in size was presented by A. J. Bard inter alia (cf. Electroanal.Chem. 18 (1994)). In this method, a laterally insulated ultramicro-electrode is guided very closely over the surface to be modified. Preferably by applying a direct voltage reagents are produced at the micro-electrode, the said reagents diffuse to the surface of the workpiece and modify said surface. The minimum size of the structure is determined by the diffusion length of the reatands.

An electrochemical material processing which produces structures in the nm range by means of extremely short voltage pulses was described by R. Schuster inter alia in Phys.Rev.Lett. 80, 5599–5602 (1998). In the case of the tests reported therein short voltage pulses were applied at a duration of $\leq 100$ ns and an amplitude up to 4 V between tip and probe of an electrochemical scanning tunnel microscope. It was possible in this manner to produce holes of approx. 5–10 nm diameter and approx. 3 monolayers deep on a gold surface. The reverse process of depositing Cu clusters by the reduction of ions from the electrolyte was possible. Care was taken in these experiments that the furthermost front part of the tip was extremely close to the surface, at a distance of only 1 nm. Owing to such a small distance, large areas of the electrochemical double layer were charged at the tip even during the first $10^{-10}$ seconds of the voltage pulse. The fact that the structures produced were nonetheless smaller than these areas is explained by the fact that during charge reversal of the double layer practically all ions in the extremely narrow space are consumed. This leads to the almost complete depletion of the electrolyte in the narrow gap, extending over several 100 $nm^2$, between the tip and the probe. The short pulse duration is not sufficient to replenish the electrolyte in the gap by means of lateral diffusion from the adjacent electrolyte volume. The electrolyte resistance in the gap is therefore infinitely large; the electrode surfaces are mutually "isolated". Only at the furthermost front end of the tip, where only approx. 3 removing agent molecules are still located between the tip and probe, do the double layers contact each other without there being pratically any electrolyte therebetween and a material-influencing reaction can only occur at this site.

In the aforementioned method the localised removal therefore relates to the local depletion of the electrolyte within a gap which on the one hand must be extremely narrow (1 nm!), on the other hand however in the case of this narrow gap it is necessary to have a predetermined minimum surface expansion. It creates technical problems to achieve this in the case of an industrial application.

All the above discussed electrochemical processing methods, insofar as they are suitable for producing extremely small structures, can only define in a two-dimensional manner the structures formed. A reproducible resolution in three dimensions, i.e. a good relative dimensional accuracy even in the depth direction, using the hitherto known electrochemical methods can at best be achieved in the case of "large" structures in the range of some ten μm.

SUMMARY OF THE INVENTION

The object of the present invention is to provide a method for electrochemically processing material, which method is suitable for forming even the smallest structures down to the sub-micrometer range and with which method it is possible to achieve a good dimensional accuracy in all three spatial dimensions.

It follows from this, that in the case of the method in accordance with the invention the resolution-determining site selection of the processing relates to local limitation of the charge reversal of the electrochemical double layer. This is a principal difference to the method known from the above mentioned publication, wherein the localised removal relates only to depletion of the electrolyte and to the excessively slow lateral diffusion of ions in the extremely narrow space between the tip (tool electrode) and probe (workpiece).

The local limitation of the double layer charge reversal is achieved in accordance with the invention by virtue of the predetermined dimensioning of the mean value of an applied pulsating or alternating electrical voltage and the voltage deflections measured relative to this mean value with respect to their duration and amplitude in order to define a distance range within which a double layer charge reversal occurs on the workpiece which is sufficient to bring about the desired electrochemical reaction, whereas workpiece areas situated at further distances do not experience a sufficient double layer charge reversal. The shape of the space between the workpiece and the tool electrode is proportioned in such a way that only points of the area of the workpiece to be processed lie within the said distance range.

The applied voltage can consist of pulses of any shape over a rest level or an alternating voltage of alternating polarity with or without direct current components, wherein the wave form of the alternating components can also be sinusoidal. In preference, a periodic voltage curve is to be selected.

BRIEF DESCRIPTION OF THE DRAWINGS

Physical principles of the invention, particular advantages and exemplified embodiments are further explained hereinunder with reference to the attached drawings, in which.

DESCRIPTION OF THE PREFERRED EMBODIMENTS

The invention exploits in a novel manner the capacitive characteristic of the electrochemical double layer which is produced on the boundary surface between the body and the electrolyte when a solid body, such as for example an electrode, is immersed in an electrolyte. This double layer is an area which is caused by charge shifting and has a thickness of only a few atom or molecular layers and behaves like a plate capacitor with an extremely small plate distance. The electric capacitance of the double layer per area unit is correspondingly high, in the case of conventional electrolytes and metal electrode materials it is in the magnitude of 10 $\mu F/cm^2$.

An electrochemical reaction, such as for example the oxidation of a metal electrode, noticeably only occurs if the potential difference on the double layer in front of this electrode, i.e. the voltage dropping off over this double layer, is sufficiently great, i.e. exceeds a predetermined threshold value $U_{reak}$. Since the double layer behaves like a capacitor, the reaction can only commence when applying an external voltage after the said potential difference has built up by virtue of the corresponding heavy charging of the double layer. The same applies also for the counter-reaction occurring at the counter electrode (for example the reduction of $H^+$). Also in this case the corresponding potential difference $U_{gegenreak}$ must be exceeded by means of the charge reversal of the double layer, so that the counter-reaction current can flow. In so doing, the charging current flows as an ion current over the electrolyte. The time constant $\tau$ of this charging process is the product of the total capacitance C of the double layers and of the ohmic resistance R of the current path over the electrolyte.

Figure 1:
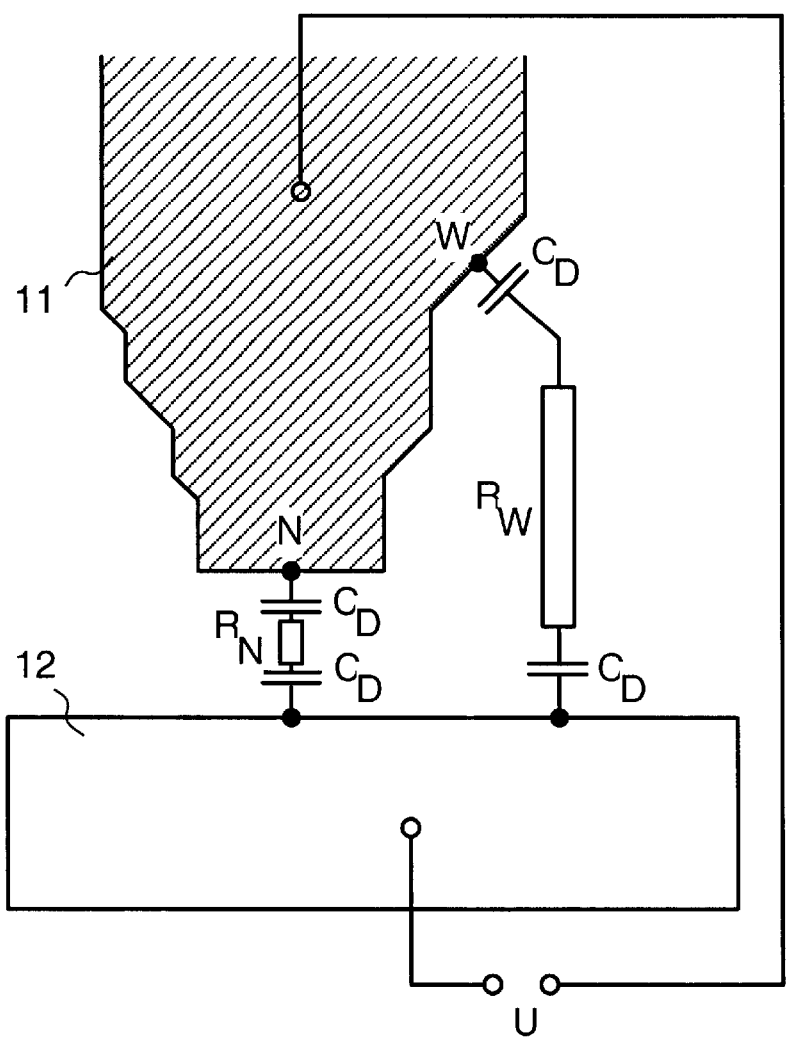
FIG. 1 is an equivalent circuit diagram of the space between two electrodes in an electrolyte.

If the distance between the two electrodes to which the external voltage is applied is localised differently, then different time constants are produced for different areas of the electrodes. This is demonstrated in FIG. 1 which illustrates the equivalent circuit diagram of an arrangement of two electrodes 11 and 12 with a non-uniform space. At the areas W where the electrode distance is great (wide) the ohmic resistance $R_W$ of the current path is, owing to the thicker electrolyte layer, greater than the resistance $R_N$ which applies for the areas N small (near) distance (at the tip of the electrode 11). When changing the applied voltage U the double layer capacitances $C_D$ at the areas W at a great distance are charged more slowly than the areas N at small distances. Possible electrochemical reactions are omitted from this equivalent circuit diagram. In order to be able to describe these it is necessary to introduce additional resistances in parallel with the double layer capacitances, whose values would however be greatly dependent upon the voltage and which are not necessary to explain the principle of the method.

Figure 2:
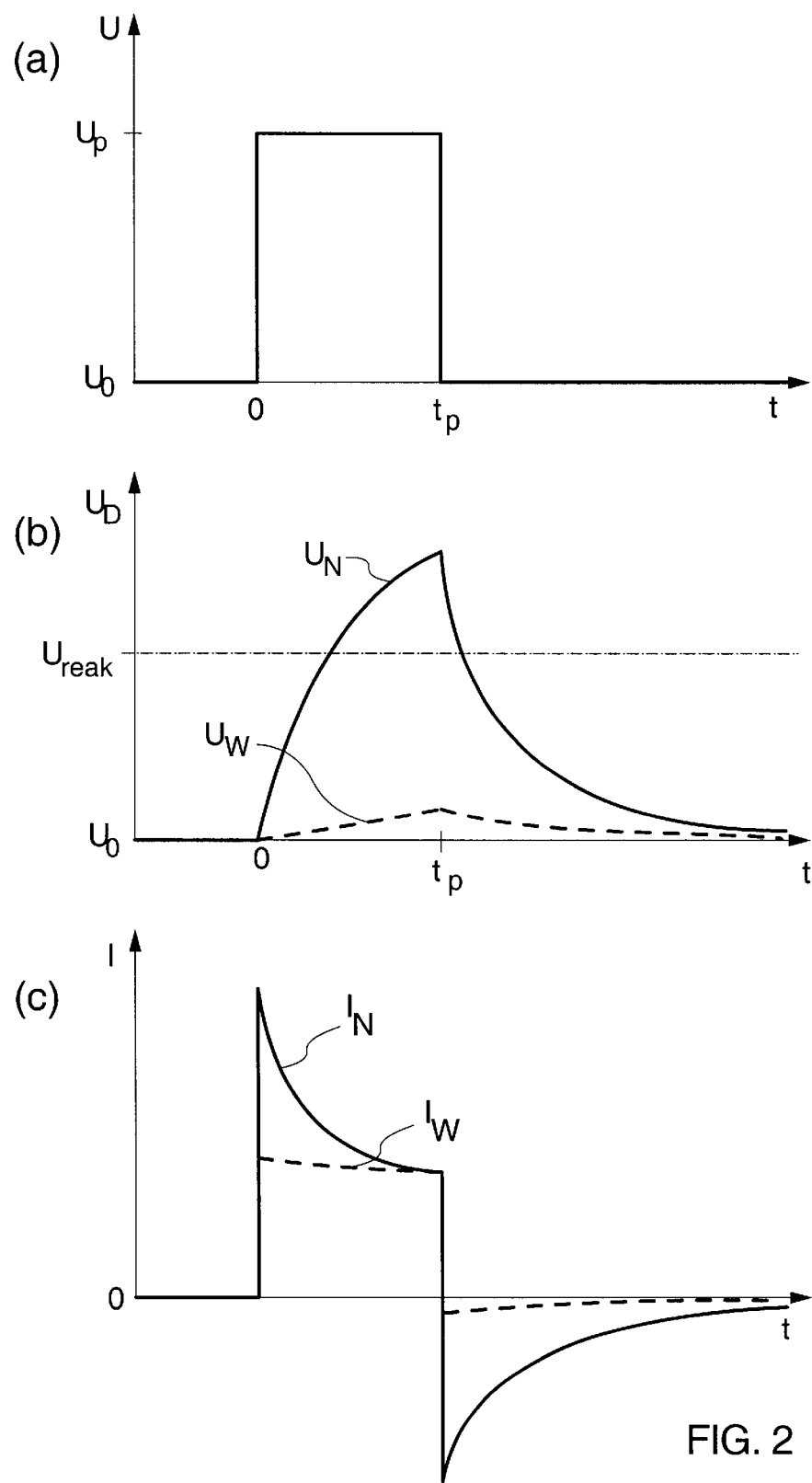
FIG. 2 shows voltage and current curves to explain the principle of the invention.

The above described effect is exploited in accordance with the invention for the purpose of localising the material processing. If the voltage change is reversed after a relatively short time, then the double layer charging at the areas W and N is terminated owing to the different time constants at different levels at which the respective reverse charging then commences. FIG. 2 demonstrates this situation using an example of a rectangular pulse. The top diagram (a) illustrates the time curve of the applied voltage U as a rectangular pulse with a maximum voltage $U_P$ of a rest voltage $U_O$ and with a width $t_P$. The diagram (b) illustrates the time curve of the charging voltage on a double layer capacitance $C_D$, wherein the curve $U_N$ (continuous line) applies for the area N at a small electrode distance and the curve $U_W$ (broken line) applies for the area of a large electrode distance. By carefully selecting the rest level, pulse amplitude and pulse width it is therefore possible to ensure that the area N is charged to a voltage which achieves or exceeds the necessary value $U_{reak}$ to bring about the desired electrochemical reaction, whereas the charging voltage in the area W remains below this value. The voltage curve at the double layer of the counter electrode progresses in a similar manner.

Where short pulses, i.e. the local oxidation of the workpiece, are used for localised material decomposition (removal), it mainly applies that the ion concentration of the associated redox partners in the electrolyte is extremely small. The reverse deposition on the electrode during the pulse can therefore be omitted and the removal rate is exponentially dependent upon the potential difference at the corresponding double layer. (As explained later in the example with reference to FIG. 3, the above threshold voltage is thus not defined very precisely. On the contrary, it corresponds to the breakdown voltage of a diode where within a few 100 mV the current rises to a value which can be easily measured, i.e. in this case a value which indicates a noticeable reaction.) Furthermore, it applies in the first approximation that the potential difference on the double layer which is achieved during the voltage pulse is proportional to the electrolyte resistance and thus approximately proportional to the length of the current path through the electrolyte and the distance of the two electrodes. Overall, therefore, the reaction rate depends approximately exponentially upon the electrode distance and the reaction is precisely limited to areas with a sufficiently small electrode distance, i.e. to areas in which the electrode distance is below a specific upper limit value.

In principle, it is therefore possible, given predetermined values of the specific electrolyte resistance and the double layer capacitances, by dimensioning $U_O$, $U_P$ and $t_P$ to define an upper limit value $d_{max}$ for the electrode distance, up to which the electrochemical reaction occurs and above which the reaction no longer occurs. On the other hand, it is possible by designing the electrode shape to define practically any shaped and expanded three-dimensional area on the electrode representing the workpiece, within which area the electrode distance does not exceed the said limit value, so that only this area is processed electrochemically.

In practice, to achieve a noticeable processing of material, it is naturally necessary to apply a large number of sequential voltage pulses, preferably in rapid succession. However, care must be taken that in the far distanced areas at the site where the double layer charge reversal of the rapid pulse sequence can no longer occur, owing to the low-pass filter behaviour of the electrode-electrolyte system a mean voltage is set which is dictated by the scanning ratio, $U_O$ and $U_P$. This voltage, which corresponds to the temporal mean value of the wave form of the voltage curve must remain clearly below a value $U_{rkt}$, so that no reaction takes place at these distanced areas.

Therefore, for the case that a sequence of voltage pulses of a defined width $t_P$ and defined maximum voltage over a defined rest level $U_O$ is applied, the instructions for selective-area processing, i.e. the instructions for limiting the desired electrochemical reaction to the area of the workpiece to be processed, can be composed as follows: the variables $U_O$, $U_P$, $t_P$, the pulse frequency and the shape of the space between the tool electrode and the workpiece are to be dimensioned such that only points of the area on the workpiece to be processed have a distance from the electrode within a range in which the electrochemcial double layer is charged by each pulse to a voltage which is greater than the minimum voltage $U_{reak}$ necessary to bring about the desired reaction. The scope for the values of $U_O$ and $U_P$ is determined by the electrochemical characteristics of the system. As mentioned above, it also applies here that with $U_O$ alone no noticeable reaction may take place on the distanced areas of the electrodes, on the other hand $U_P$ must have a value which is sufficiently large in order to process electrochemically the workpiece electrode at points with sufficiently small distance.

Figure 3:
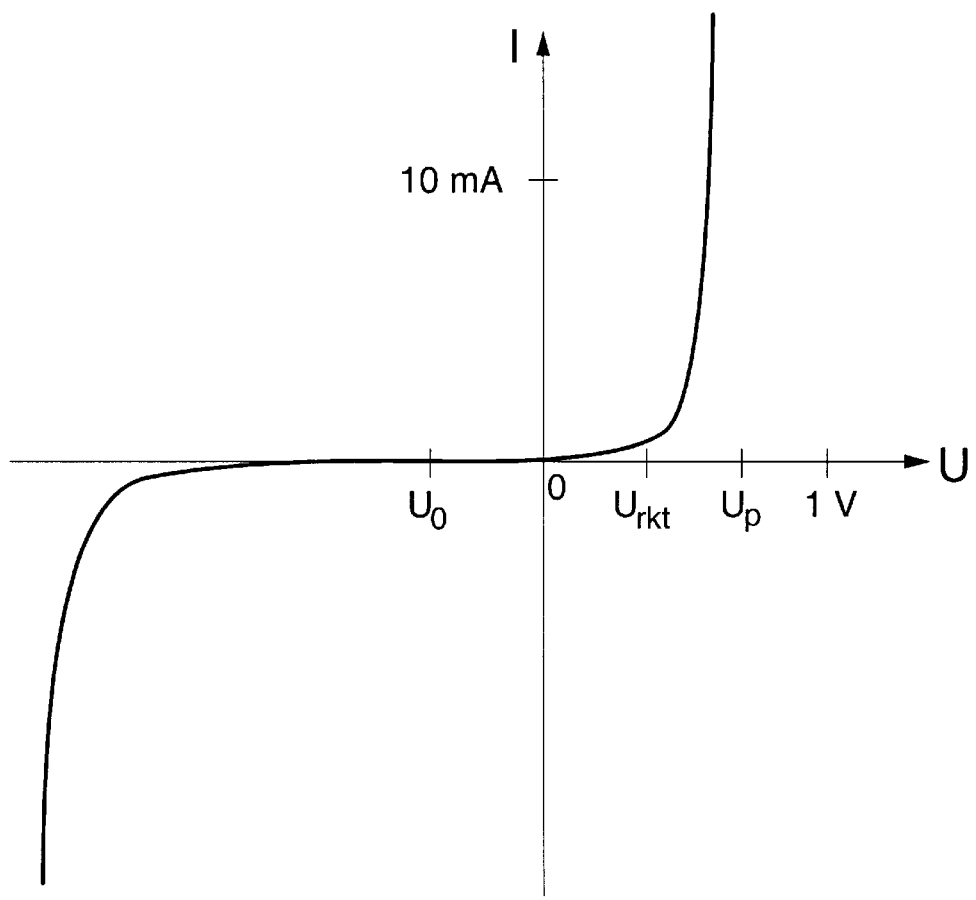
FIG. 3 illustrates the stationary current/voltage curve in the case of a Cu workpiece electrode and an Au tool electrode in an electrolyte which contains 1 M KCl and 0.1 M $H_2SO_4$.

In order to establish $U_O$ and $U_P$ it is therefore possible to use as an aid the current/voltage characteristic curve of the electrochemical two electrode system (system characteristic curve or "voltammogram"). FIG. 3 illustrates an example of such a voltammogram for a Cu workpiece electrode and an Au tool electrode in a 1 M KCl/0.1 M $H_2SO_4$ electrolyte in the case of an electrode distance, usual in conventional electrochemical processing, of several millimetres. Possible adsorption of ions, the formation of a complex or an upper structure at the electrodes are omitted from this illustration. In the case of positive voltages on the workpiece electrode the current rises greatly above a "threshold voltage" $U_{rkt}$. At this site oxidation of the Cu occurs on the Cu electrode and the reduction of $H_3O^+$ from the electrolyte to hydrogen occurs on the counter electrode. A sensible value for the voltage $U_P$, which is to achieve the local processing, is therefore for example 700 mV, several 100 mV more positive than the threshold voltage $U_{rkt}$. In the illustrated voltammogram which would be recorded virtually under direct voltage conditions, $U_{rkt}$ is composed of the potential drops of the two double layers; the reaction current must flow over both double layers connected in series ($U_{rkt}=U_{reak}+U_{gegenreak}$). In the case of short pulses, i.e. prior to setting the virtually stationary current flow of the system, a reaction current flowing over a double layer could however also contribute to charging the other double layer, without a reaction having to take place at the site in advance. It would then be possible to process the workpiece even at pulse voltages $U_P$ below the direct voltage $U_{rkt}$ measured in the voltammogram. By selecting $U_P$ to be greater than the measured $U_{rkt}$ a reaction is ensured.

In the middle region of the voltammogram no noticeable reaction current flows, i.e. the workpiece is not processed. It is necessary to ensure at the sites which are not to be processed that the potential of the electrodes remains in this range even after the accumulative charging of the $C_D$ owing to the low-pass filter behaviour discussed above. These conditions are sufficiently fulfilled with a value for $U_O$ of −400 mV at a scanning ratio of 1:10 and the $U_P$ of +700 mV established above.

For the parameters $U_O$ and $U_P$ found for example according to the above instructions for a given electrochemical system and for an initially freely selected pulse length $t_P$ it is only possible to determine the upper limit $d_{max}$ of the distance d which is to be maintained for processing between a workpiece and tool.

A first option is to determine the upper limit $d_{max}$ by means of an experiment as follows:

The desired effect, i.e. that sufficient charging is occurring with each pulse, can be verified by observing the electrode current. FIG. 2 illustrates in the diagram (c) on the same time scale as the diagram (a) the curve of the current with a great electrode distance (broken curve). At sites where the distance is extremely large, i.e. where the electrolyte resistance is great and as a consequence the time constant τ is large, the double layer capacitances are not noticeably charge-reversed during the pulse. The current is therefore practically constant during the pulse and follows the form of the voltage pulse. As the electrode distance reduces, the double layers are increasingly greatly charge-reversed at electrode areas which are close, which can be recognised by virtue of the fact that a pronounced charging peak protrudes from the front flank of the pulse (continuous curve). This charging current then drops greatly during the voltage pulse. Added to this current is naturally the constant charging current of the areas which are at a greater distance, so that the charge reversal only influences the uppermost plateau of the current pulse. Following the end of the voltage pulse the charge-reversed double layer areas are likewise then rapidly discharged, which is noticeable as an opposing reverse charge current peak. Naturally, the further distanced areas of the double layer are also then discharged. However, as the accumulated charging voltage at this site is small and the time constant large, these areas hardly contribute anything to the opposing peak.

By observing the charging or reverse charging peaks of the electrode current it is possible to confirm whether an electrode distance is below $d_{max}$, i.e. is sufficiently small to ensure the sufficient charge reversal to bring about the desired electrochemical reaction. In one test it is possible for example to move a test electrode with a relative large and planar end face gradually towards a likewise planar workpiece surface, wherein the parameters $U_O$, $U_P$, $t_P$ are held at known, pre-set values. As soon as the electrode current demonstrates clear charging or reverse charging peaks, the upper limit $d_{max}$ of the electrode distance required to bring about the reaction is achieved for specific areas of the electrodes. If it appears practical, this value can then be used for dimensioning the electrode shape and the electrode distance for the processing procedure. If the determined upper limit $d_{max}$ is not practicable, (for example if $d_{max}$ is greater than the structures to be produced), it is possible to set a different value for $d_{max}$ after changing the above mentioned parameters and/or the specific electrolyte resistance r (change the electrolyte concentration).

It generally applies that a shortening of $t_P$ causes a reduction in $d_{max}$ as now the double layer of the areas to be processed must be charge-reversed more rapidly, which can only be sufficiently achieved with less resistance along the current path in the electrolyte, i.e. smaller distance. In a similar manner, a reduction of the electrolyte concentration also effects a reduction in $d_{max}$.

The relationship of the method parameters $U_O$, $U_P$, $U_{rkt}$, $t_P$, and $d_{max}$ can also be represented mathematically by means of a mathematical equation which describes the charging voltage curve U(t) illustrated in the diagram (b) of FIG. 2. This equation is generally as follows:

$$U(t)=U_O+(U_P-U_O)\cdot[1-\exp(-t/\tau)] \qquad (1)$$

The time constant τ of the charge reversal is obtained by means of the product from the resistance of the current path through the electrolyte and the total-double layer capacitance. For plane-parallel electrodes, which is fulfilled locally at least in the working gap, it thus applies that τ=r·c·d, with c=$c_1 \cdot c_2/(c_1+c_2)$, wherein $c_1$ and $c_2$ are the capacitances of the double layers per area unit on the two electrodes; d represents the distance of the electrodes.

The conditions for bringing about the desired electrochemical reaction are considered to be fulfilled if the charging voltage on the double layer achieves the value $U_{rkt}$ at the latest at the end of the voltage pulse, i.e. for $t=t_P$. This means mathematically, after applying $t=t_P$ and t=r·c·d:

$$U_O+(U_P-U_O)\cdot(1-\exp[-t_P/(r \cdot c \cdot d)]) \geq U_{rkt} \qquad (2)$$

This equation therefore demonstrates, for example in the case of predetermined other parameters, the maximum electrode distance $d_{max}$, for which this condition $U(t)=U_{rkt}$ is fulfilled. It is also to be noted that the above mathematical equations are formulated with the convention that positive voltages are applied to the anode. Where material is removed locally on the workpiece, the workpiece is the anode.

If the pulse amplitude ($U_P-U_O$) is not significantly greater than the voltage ($U_{rkt}-U_O$) required for the reaction, i.e. when the said pulse amplitude is less than twice as high as that of the minimum amplitude above which a noticeable material-processing electrochemical reaction occurs, then it can be more or less assumed that after a charging duration $t_P$, which corresponds to the value of a time constant τ=r·c·$d_{max}$, the double layers are sufficiently reverse charged. The above condition for $d_{max}$ reduces then to the simple estimation:

$$t_P \approx r \cdot c \cdot d_{max} \qquad (3)$$

Typical values are r=10 Ωcm (for an electrolyte concentration of 1 mol/litre, i.e. a 1 M electrolyte) and c=10 μF/cm². If in this case the electrochemical reaction is only to take place at areas of the electrodes at a distance less than $d_{max}$=1 μm, then the following applies for the pulse duration:

$$t_P \approx 10 \text{ Ωcm} \cdot 1 \text{ μm} \cdot 10 \text{ μF/cm}^2 = 10^{-8} \text{ s} \qquad (4)$$

Rectangular pulses of this duration can be achieved without any problem using conventional electronics.

It is possible to improve the local resolution, i.e. reduce $d_{max}$, by shortening the pulse width $t_P$ and/or lengthening the time constants τ. Pulses down to 1 ns length could be generated with commercially available means. The time constant can be lengthened, in that the specific electrolyte resistance is increased or the concentration reduced. One criterion for the minimum concentration is that sufficient ions are located in the gap between the tool electrode and the workpiece in order to reverse charge the double layers and to direct the reaction current. It is, therefore, quite possible to use concentrations of 0.01 to 0.1 M. This renders it possible to underachieve the local resolution ($d_{max}$), described in the above calculation example, of 1 μm by a factor of 10 to 100.

Figure 4:
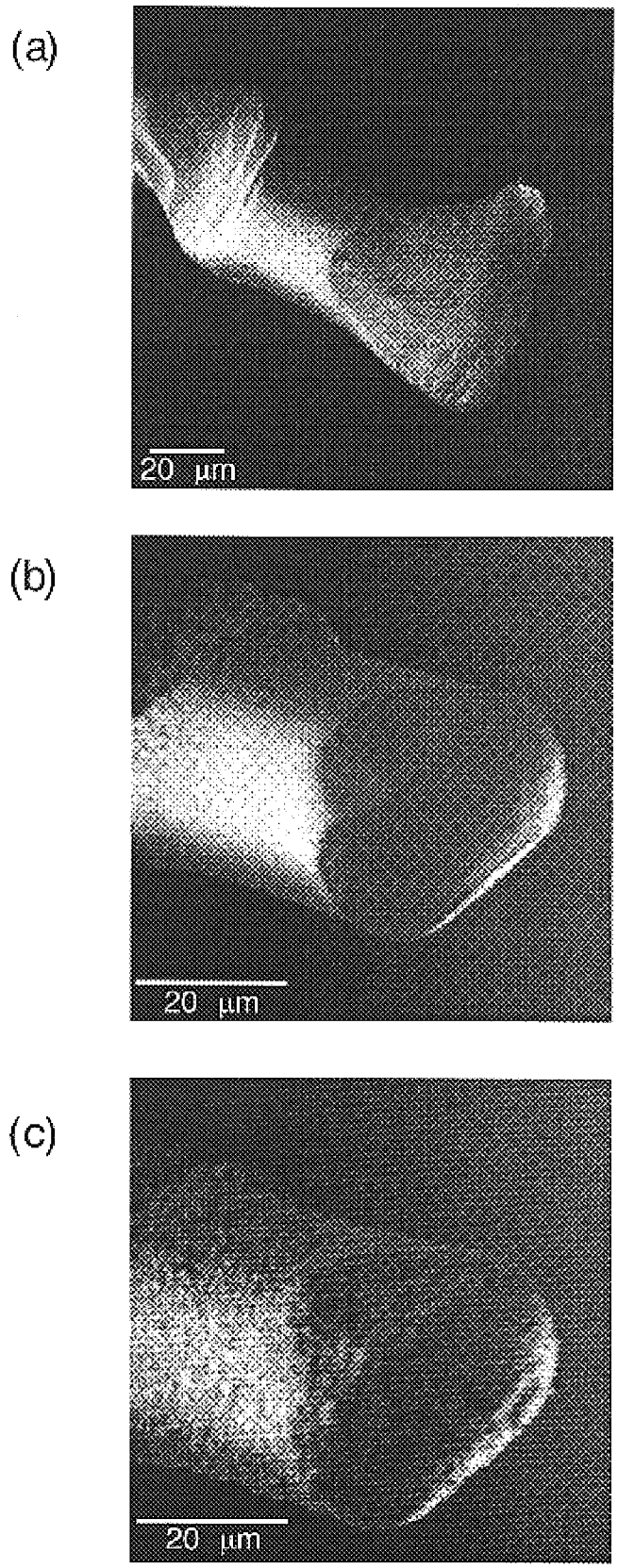
FIG. 4 shows electron-microscope photographs of the tip of a copper wire prior to etching (a) and after etching with 50 ns wide pulses (b) and with 10 $\mu$s wide pulses (c) in an electrolyte which contains 1 M KCl and 0.1 M $H_2SO_4$.

In order to demonstrate the technical aspects of the method in accordance with the invention a copper wire of 40 μm diameter was processed electrochemically using short pulses. The results are illustrated in the diagrams in FIG. 4. The first diagram (a) in FIG. 4 illustrates a scanning electron microscope photograph of the wire after being cut to length using a side cutter. Using a gold film as a counter electrode (tool electrode), this wire was subsequently etched for 30 minutes in an electrolyte solution which contained 1 M KCl and 0.1 M $H_2SO_4$ with 50 ns wide rectangular pulses of +1.1 V amplitude with respect to the counter electrode and a pulse duration/pulse interval ratio of 0.1 (scanning ratio 1:11). To prevent the wire corroding in the chloride-containing electrolyte during the pulse intervals the rest voltage of the wire is set to −400 mV with respect to the counter electrode.

The tip of the wire was held by means of an electromagnetic adjusting device during the entire etching period at a distance of a few tenths μm from the gold surface. The result is illustrated in the second diagram (b) of FIG. 4. It is recognised that the wire at the front, where it was directly opposite and very close to the gold surface is flat etched, whereas the side surfaces remain practically unchanged. A sharp edge with a curvature radius of a few μm was formed and this defined the etched area. In other words, an electrochemical reaction only occurred where the wire was so closely opposite the gold surface that the double layer capacitance on the wire could be sufficiently charge-reversed. The double layer on the side surfaces, on the other hand, was not sufficiently charge-reversed for a noticeable reaction. The edge sharpness or local resolution in the μm range corresponded well to the above estimation.

For comparison purposes, the wire tip was further etched using substantially wider pulses of 10 μm duration but otherwise identical conditions. The result is illustrated in the third diagram (c) in FIG. 4. It is evident that the edge was very much rounder and also the shaft of the wire was noticeably etched. The length of the pulse duration was therefore sufficient to charge reverse the double layer in large areas relatively far away from the gold surface. This result is therefore hardly different from the results achieved using conventional direct voltage electrochemical processing.

Figure 5:
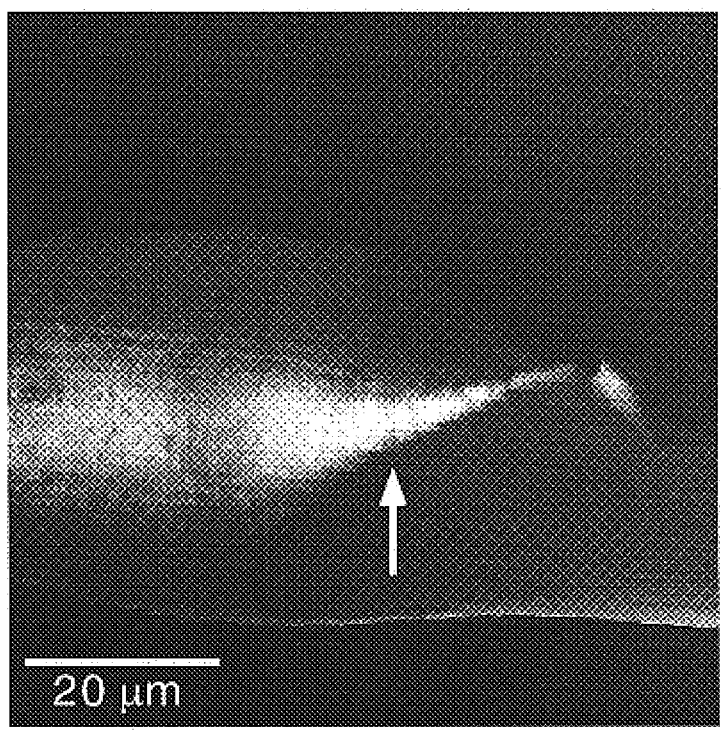
FIG. 5 shows electron-microscope photographs of the tip of a copper wire prior to etching (a) and after etching (b) with 50 ns wide pulses in an electrolyte which contains 0.1 M KCl and 0.01 M $H_2SO_4$.
Figure 5:
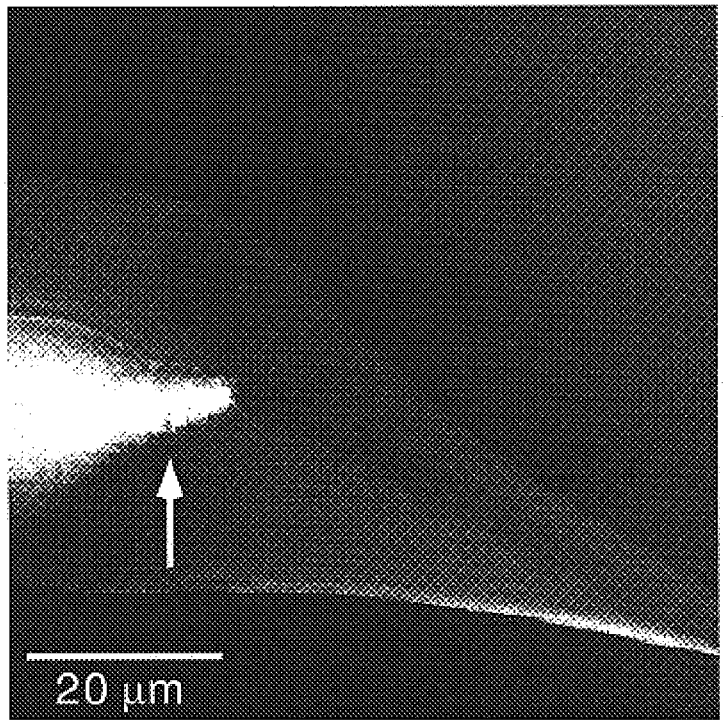

The local resolution is even better if the electrolyte concentration is reduced. By means of etching for 60 minutes in an electrolyte (0.1 M KCl and 0.01 M $H_2SO_4$) diluted by the factor 10 with 50 ns wide voltage pulses a copper wire tip of the shape illustrated in the top diagram (a) in FIG. 5 was processed. As the result illustrated in the lower diagram (b) of FIG. 5 shows, this processing reduced the length of the tip by approx. 10 μm (for orientation purposes a defect on the wire shaft is marked in both figures). The edge is now clearly sharper than in diagram (b) in FIG. 4. Owing to the smaller electrolyte concentration the removal rate was lower than in the case of the experiment illustrated in diagram (b) in FIG. 4. This can, if desired, be compensated by reducing the electrode distance.

In the case of the experiment which was performed using the pulse widths of 50 ns and which produced the good result illustrated in diagram (b) in FIG. 4, the curve of the electrode current corresponded to the continuous curve in diagram (c) in FIG. 2. The current peaks are, as explained above, greatly dependent upon the distance and demonstrate directly the charge reversal of the double layers and thus the commencement of the reaction. This can therefore also be used as a control variable for readjusting the electrode distance.

Figure 6:
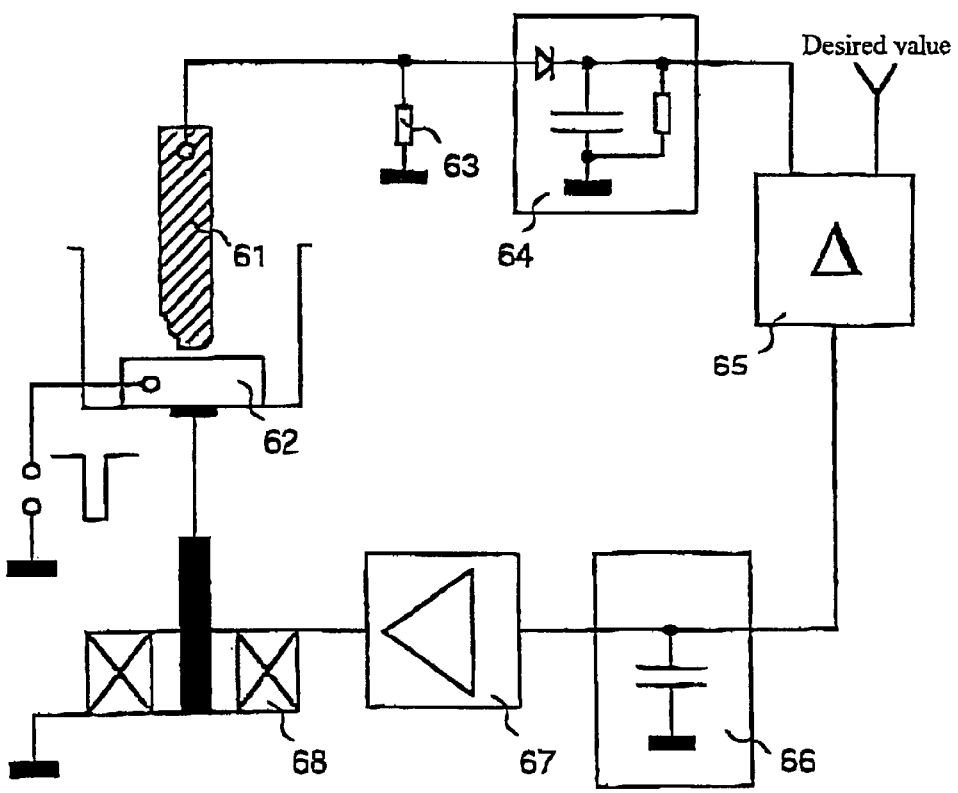
FIG. 6 is a schematic illustration of a control circuit which can be used when implementing the method in accordance with the invention.

An example of such a control circuit, as was also used in the experiment described, is illustrated in FIG. 6. The short voltage pulses, as illustrated on the left as a negative pulse, were applied between the one electrode 62 (e.g. a gold electrode) and the other electrode 61 (e.g. a workpiece to be etched) and a current measuring resistance 63. The pulse generator and the device which produces a suitable rest voltage between the pulses and can be a component of the pulse generator, are not illustrated. The reverse charge peak of the electrode current (which is positive in the illustrated case owing to the special circuit) is measured at the measuring resistance 63 using a peak detector 64 and compared as a control variable actual value in an actual value/desired value comparator 65 with a desired value. The difference determines by means of a low-pass filter (integrator or I-controller) 66 and a downstream amplifier 67 the position of an electromagnetic adjusting member 68 which has an adjustment path of some 10 μm. This control guarantees that, as the processing continues, the gap between the area to be processed on the workpiece 61 and the tool electrode 62 is always held at the desired distance, which on the one hand is sufficiently small to obtain the desired local resolution, on the other hand however, is sufficiently high to avoid a short circuit or to avoid the depletion in the gap of the charge carrier described above. The desired value for the control variable is set accordingly.

In place of the reverse charge peak of the electrode current it is also possible to use as the control variable the opposing charge peak which appears on the front flank of the applied voltage pulse or the peak-peak amplitude of the electrode current.

In order to hold the mean value of the applied voltage within the range in which no noticeable reaction current flows (for the case illustrated in FIG. 3 of the oxidation of Cu, this means the value in the range left of $U_{rkt}$ in FIG. 3), it is also possible to use a bi-potentiostatic control system. The mechanism of a bi-potentiostatic control is generally known in electrochemical processing; its use for the purpose of performing a defined adjustment of the mean value of the applied voltage in the case of the material processing method in accordance with the invention is illustrated hereinunder with reference to FIG. 7.

Figure 7:
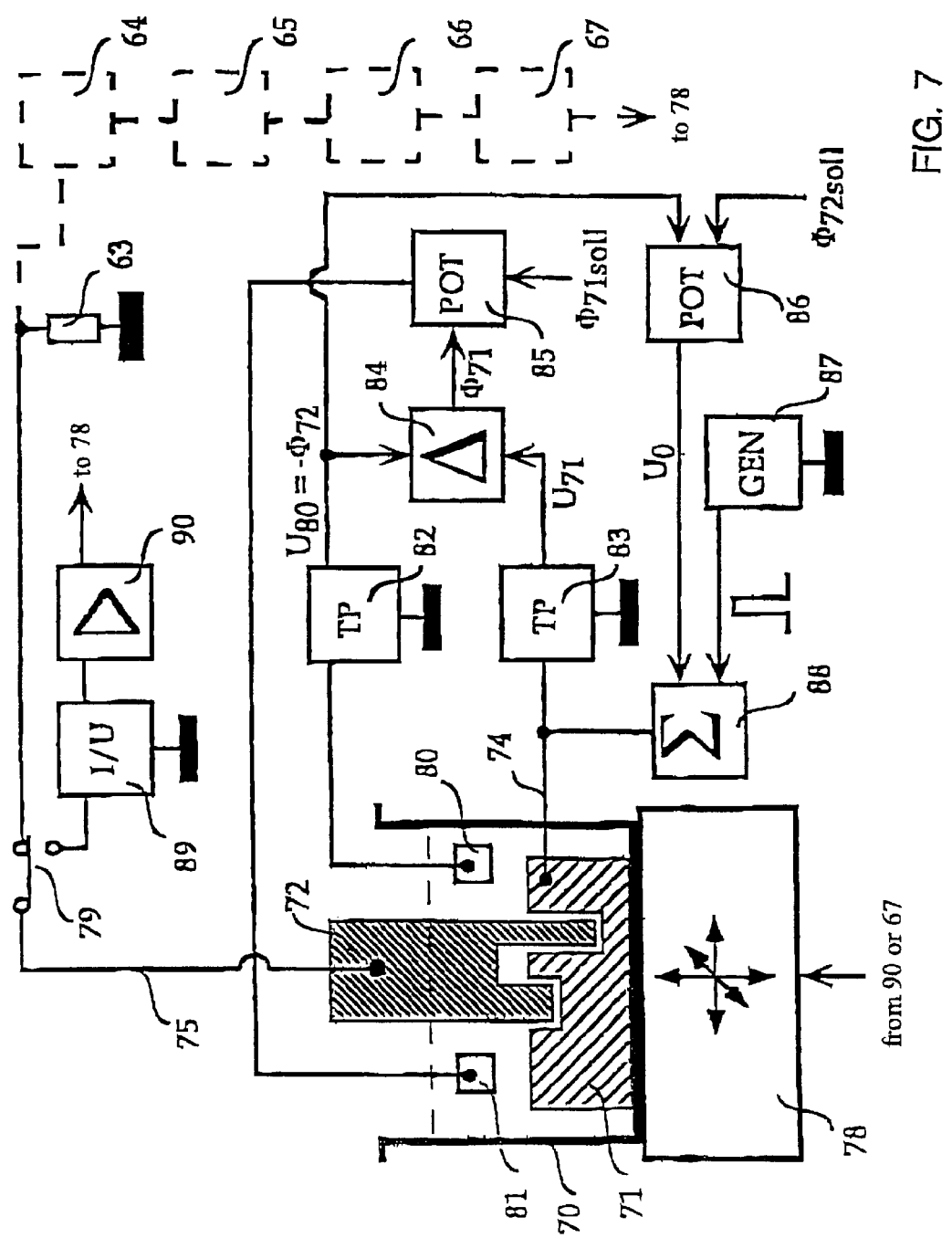
FIG. 7 is a schematic illustration of a bi-potentiostatic control system for the mean value of the processing voltage.

FIG. 7 illustrates in the block diagram the bi-potentiostatic control system using the example of the electrochemical etching of a depression in a workpiece 71 using a tool electrode 72. The workpiece 71, for example a copper (Cu) body, lies in a vessel 70 which is filled with a suitable electrolyte and for its part stands on a feed table 78. The stationary tool electrode 72, for example a platinum iridium alloy (Pt/Ir) wire, is immersed in the electrolyte almost as far as the surface of the workpiece 71 to be etched. The processing voltage modulated with short pulses is applied via a line 74 to the workpiece 71; the processing current flows from the workpiece 71 through the electrolyte to the tool electrode 72 and from there to earth, in the case illustrated via the line 75 and a current measuring resistance 63. In this respect, the arrangement is similar to the design illustrated in FIG. 6 with the tool and workpiece interchanged.

The voltage applied to the line 74 and hence to the workpiece 71 (with respect to the earth potential of the tool electrode 72) consists, in accordance with the fundamental idea of the invention, of short pulse-shaped deflections relative to a mean value. This means, this voltage corresponds to an overlapping of pulses of the amplitude $U_P$–$U_O$ over a rest level $U_O$. In the case of embodiment illustrated in FIG. 7, the pulses (positive in the present example) are produced with the amplitude $U_P$–$U_O$ with respect to earth by a pulse generator 87 and superimposed in a summation member 88 over the rest level Uo, which is set by means of the bi-potentiostatic control system which comprises the elements 80–86.

For this purpose, located in the electrolyte are a reference electrode 80 and a counter electrode 81. The potential $U_{80}$, measured with respect to earth, of the reference electrode 80 and the potential $U_{71}$, measured with respect to earth, of the workpiece 71 are in each case directed via an associated low-pass filter 82 or 83 to the inputs of a subtractor 84. The difference value formed there $U_{71}$–$U_{80}$, i.e. the electrochemical potential $\Phi_{71}$, measured with respect to the reference electrode 80, of the workpiece 71, is directed to a first input of a potentiostat 85, at whose second input the desired value $\Phi_{71soll}$ for the electrochemical potential of the workpiece 71 is applied. The output of the potentiostat 85 sets the potential of the counter electrode 81 such that the mean low-pass filtered electrochemical potential $\Phi_{71}$ of the workpiece 71 with respect to the reference electrode 80 is equal to the predetermined desired value $\Phi_{71soll}$.

Furthermore, the low-pass filtered voltage $U_{80}$ measured at the reference electrode 80 with respect to earth corresponds to the negative electrochemical potential $-\Phi_{72}$ of the tool electrode 72 lying at earth potential, in relation to the reference electrode 80 (the voltage drop at the current measuring resistance 63 is generally small in comparison to $\Phi_{72}$ and therefore can be omitted). A second potentiostat 86 receives this signal and by way of the rest level $U_O$ of the workpiece 71 applied to the summation amplifier 88 adjusts the electrochemical potential of the tool electrode 72 measured with respect to the reference electrode 80 to the predetermined desired value $\Phi_{72soll}$. Both potentiostats 85 and 86 naturally have a mutual effect on each other by way of the electrochemical cell and must compensate for possible control deviations. By suitably dimensioning the time constants of the control members, the (low-pass filtered) electrochemical potentials, measured with respect to the reference electrode 80 of the workpiece and tool electrode, is adjusted to the predetermined desired values $\Phi_{71soll}$ and $\Phi_{72soll}$ which are selected independently of each other. Both desired values are selected such that without pulses being applied, no noticeable reaction current flows, either at the tool electrode or at the workpiece, i.e. at the workpiece the reaction desired for a processing procedure does not take place and at the tool electrode side reactions are sufficiently prevented.

The low-pass filters 82, 83 are to prevent the potentiostats 85 and 86 being adversely affected by the pulses. For this reason, their limit frequency is much smaller than the repetition frequency f of the pulse generated by the generator 87 (i.e. the time constant of the filter is, for example, $10^3$- to $10^4$-times greater than $1/f$).

This control system renders it possible to determine the voltage difference between the workpiece and tool and thus the mentioned rest level $U_O$ by means of the electrochemical potentials, adjusted with respect to the reference electrode 80, of the workpiece 71 and tool 72. It is to be noted at this point that the electrochemical potential of the tool can mainly be freely selected in the range of some 100 mV, so that it is not absolutely necessary that this potential is potentiostatically controlled. Accordingly, it is also possible to replace the potentiostat 86 by an adjustable voltage source.

The low-pass filtering and the described bi-potentiostatic control function is that the mean potentials of the workpiece 71 and tool electrode 72 influenced by the scanning ratio of the pulses and their maximum voltage $U_P$ are automatically readjusted to the predetermined electrochemical desired potentials. This simplifies the processing of such unstable systems as a Cu film in equilibrium with a Cu ion-containing electrolyte. Even slight displacements of the electrochemical potential of the workpiece, i.e. of the film, would lead to large area dissolution of the film or cause it to grow in size.

For the purpose of adjusting and also controlling the distance between the workpiece 71 and the tool electrode it is possible to use in place of the electromagnetic adjusting element 68 which is illustrated in FIG. 6 the piezo feed table 78 illustrated in FIG. 7. This can be displaced in 3 dimensions and can be equipped with 3 allocated expansion measuring strips (not illustrated) for the purpose of measuring the absolute position of the tool 71 with respect to the tool electrode 72. The zero point of the distance which corresponds to the contact state between the workpiece and the tool can be measured by means of a tunnel current between these two electrodes. For this purpose, the line 75 leading from the tool electrode 72 is decoupled from the current measuring resistance 63 by way of a switch 79 and switched over to a highly sensitive current measuring amplifier (I/U convertor) 89 with a conversion of $10^6$ V/A which operates the table 78 by way of the output amplifier 90 of a scanning tunnel microscope. At the expansion measuring strips the absolute position of the table 78 and thus the workpiece electrode 71 is measured when the tunnel current is present. The line 75 is then switched back to the current measuring resistance 63, the table 78 is moved backwards by the amount and in the direction of the desired minimum distance, which can be verified by way of the expansion measuring strips. The processing pulse is then applied. The forward movement in the desired direction during the processing can then be continued by suitably controlling the table 78, for example by controlling it as was described in connection with FIG. 6, i.e. in that the capacitive component of the electrode current serves as the control variable, possibly using the elements 64, 65, 66 and 67 illustrated in FIG. 6, as illustrated in FIG. 7 by the broken line. A further possibility is the automatic forward feed of the table 78 at a constant rate, which is selected to be sufficiently slow that during the processing procedure the two electrodes do not short circuit as a result of electrical contact.

The bi-potentiostatic control system illustrated in FIG. 7 can also be used to produce a Cu film in a controlled manner before this film is processed as a workpiece 71 by voltage pulses of the amplitude $U_P-U_O$ over a rest voltage level $U_O$ which is controlled in the manner described above. The Cu film is first deposited on a conductive substrate (e.g. a gold film on a glass plate) from a Cu ion-containing electrolyte (for example 0.1 M $HClO_4$/0.05 M $CuSO_4$). For this purpose, the electrochemical potential of the substrate is set with the aid of the potentiostat 85 to be negative with respect to the $Cu/Cu^{2+}$-redox potential in this electrolyte. The tool electrode 72 (for example, a surface-ground Pt/Ir wire of 50 $\mu$m diameter) can already be located in the electrolyte. Its electrochemical potential is set with the aid of the bi-potentiostat such that no noticeable current flows via it. In the case of the present invention, this means, for example 100 mV positive with respect to the $Cu/Cu^{2+}$-redox potential. Once the Cu film has been deposited in the desired thickness, the electrochemical reaction stops, in that the desired value $\Phi_{71soll}$ of the electrochemical potential of the workpiece 71 is set to the redox potential of $Cu/Cu^{2+}$. This means that there is no measurable flow of Cu deposition or removal current, which would otherwise result in the film being removed or spreading over a wide area. The Cu film in the case of this potential is stable for the duration of the processing, possibly for hours. The film is then processed by applying voltage pulses of the amplitude $U_P-U_O$ over a rest voltage level $U_O$. The potentiostatic control of the electrochemical potential of the workpiece to the redox potential of $Cu/Cu^{2+}$ ensures that outside the area to be processed the Cu film remains unchanged.

Figure 8:
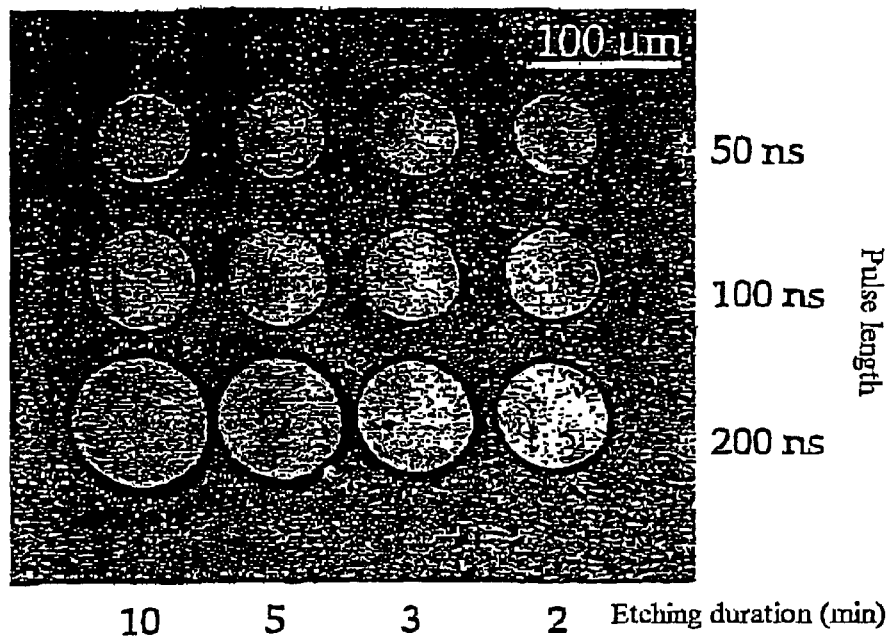
FIG. 8 shows microscope photographs of the results of etching depressions in a copper film using different width pulses and different durations of etching periods in an electrolyte of $HClO_4$ and $CuSO_4$ in the ratio 2:1, with different electrolyte concentrations of 0.1 M (a) and 0.03 M (b) and applying the bi-potentiostatic control system according to FIG. 7.
Figure 8:
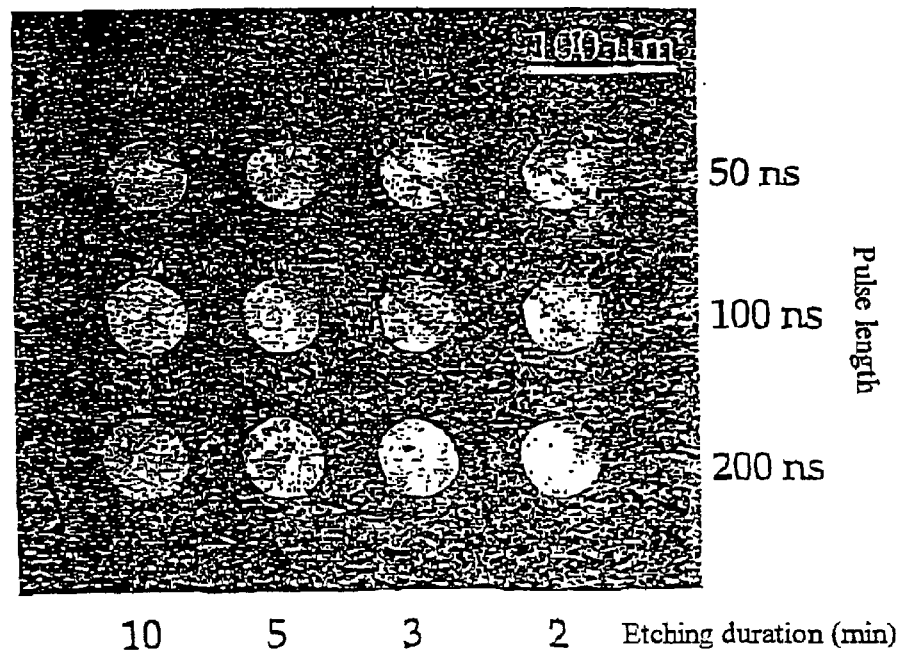
Figure 9:
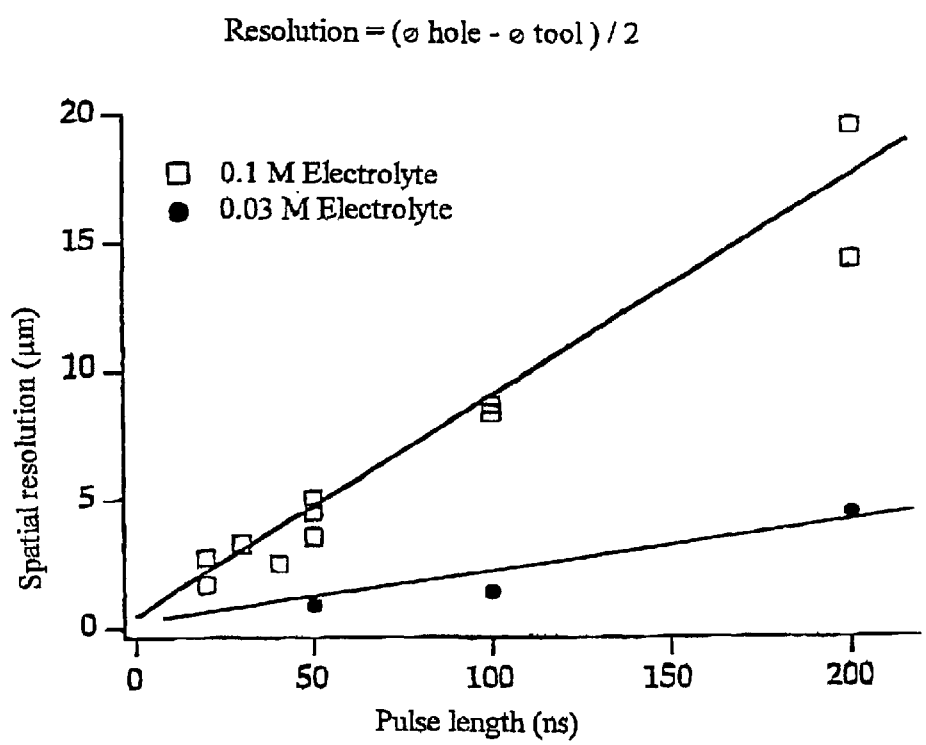
FIG. 9 shows in a diagram the spatial resolution achieved using the etching treatments in accordance with FIG. 8.

The FIG. 8 illustrates microscope photographs of holes which have been obtained by the electrochemical material processing of a Cu film, produced in the manner described above, onto gold in the electrolyte mentioned there. The bi-potentiostatic control described with reference to FIG. 7 was used. The holes are results of different processing using voltage pulses between 50 ns and 200 ns duration and 1.5 V pulse amplitude (workpiece electrode positive, local oxidation of the Cu film) and for etching periods of different durations. Tests using different electrolyte concentrations were performed. The diagrams (a) and (b) in FIG. 8 illustrate the results using concentrations of 0.1 M and 0.03 M. The scanning ratio of the pulse amounted in all these experiments to 1:10. A surface-ground Pt/Ir wire with a diameter of 50 µm was used as the tool and was moved with the end face close to the Cu film. The distance of the end surface to the Cu film amounted to approx. 0.5 µm. FIG. 9 illustrates in a diagram the spatial removal achieved (hole diameter minus wire diameter divided by 2), i.e. the width of the working gap in dependence upon the etching parameters. The spatial resolution has a scale which is fairly linear with the pulse length and the electrolyte concentration; i.e. the resolution is "coarser" (less fine) the greater the pulse length or the higher the electrolyte concentration. This corresponds to the model described above, wherein the typical charge time constant of the double layer $\tau = r \cdot c \cdot d$ has a scale which is linear with the specific electrolyte resistance r and the electrode distance d. In the case of shorter pulses or lower electrolyte concentrations or higher electrolyte resistances, the distance between the workpiece and the tool electrode is therefore correspondingly shorter until the charge reversal of the double layer still occurs sufficiently for a reaction.

Figure 10:
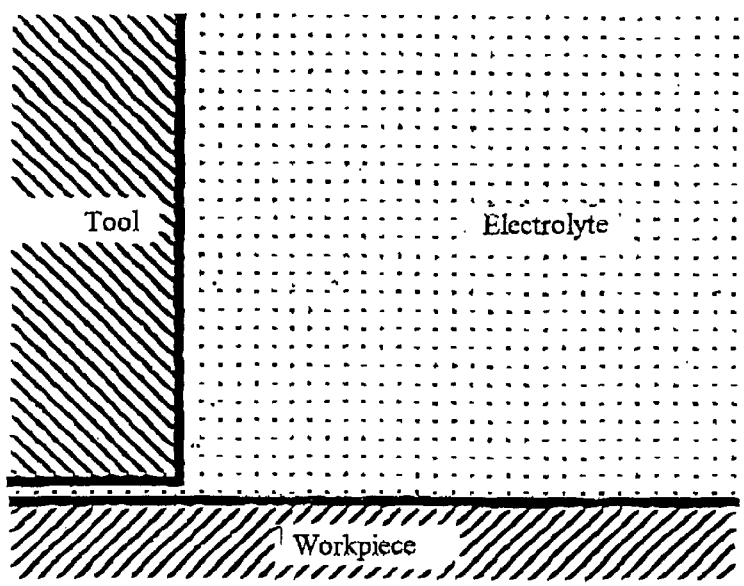
FIG. 10 illustrates an arrangement of the workpiece and tool electrode to simulate the etching rate.
Figure 11:
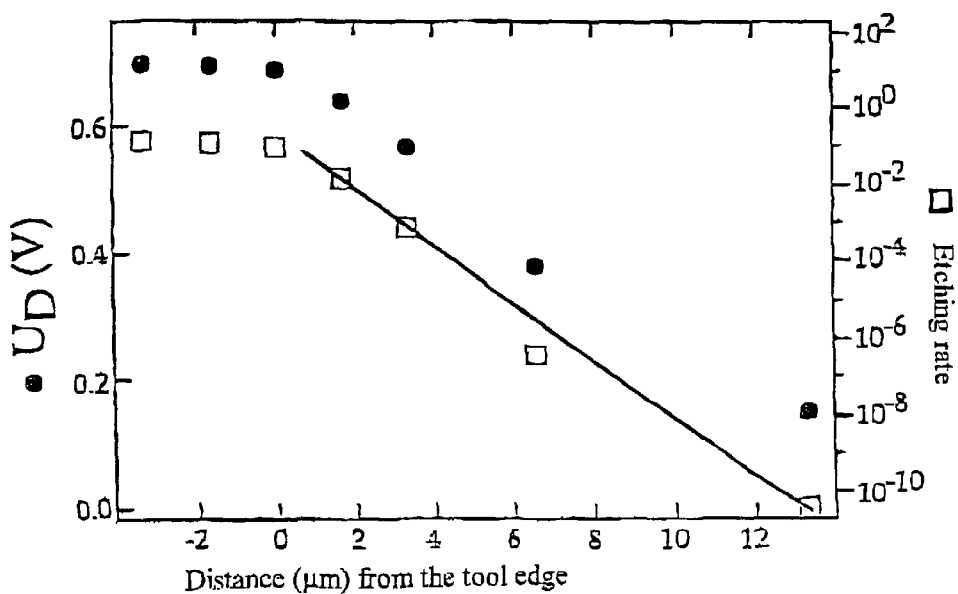
FIG. 11 is a diagram of the simulated etching rate on the arrangement as shown in FIG. 10.

The test results illustrated in FIGS. 8 and 9 can also be confirmed by observing the etching rate in a simulated electrode arrangement as illustrated in FIG. 10. Assumed is a specific double layer capacitance $c = 10$ $\mu F/cm^2$ on the electrodes and a specific electrolyte resistance $r = 30$ $\Omega cm$. The charge reversal of the double layers of the electrodes was calculated for 50 ns length, 1.5 V amplitude voltage pulses in a 0.1 M $HClO_4$ electrolyte. The cylindrical tool electrode is a few 100 nm in front of the Cu film which forms the workpiece. FIG. 11 illustrates the values of the charge reversal voltage $U_D$, as they are achieved shortly prior to the end of the voltage pulses in the double layer of the workpiece electrode. While the electrode areas lying directly opposite the tool are charge reversed to a maximum extent, the charge reversal voltage drops in an approximately linear manner as the distance from the tool edge increases. The Cu removal rate (etching rate) depends exponentially on the under potential, in this case from the charge reversal voltage $U_D$ in the double layer. This is also drawn in FIG. 11 for typical parameters. At a distance of 4 µm from the tool edge, the Cu removal already starts to drop to 1/1000 of the etching rate in the narrow gap. As the distances becomes greater, it continues to drop exponentially. During the course of an experiment with 50 ns long and 1.5 V high pulses, the etching of the Cu films stops de facto a few µm from the tool edge. This corresponds to the experimental results illustrated in FIGS. 8 and 9.

Figure 12:
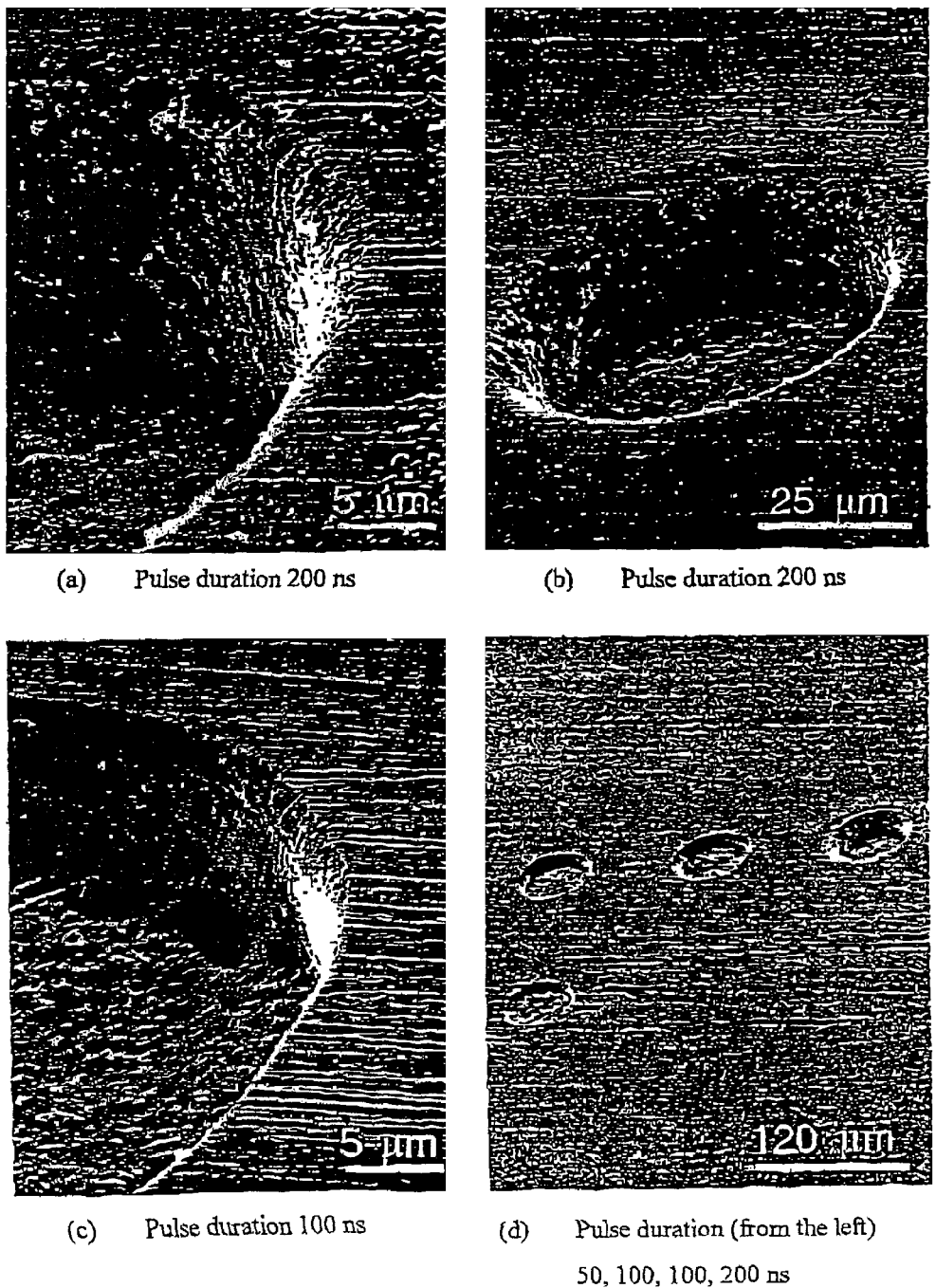
FIG. 12 illustrates electron-microscope photographs of the results of etching depressions in a copper sheet using different width pulses in an electrolyte which contains 0.1 M $HClO_4$ and 0.05 M $CuSO_4$ and applying the bi-potentiostatic control system according to FIG. 7.

The diagrams (a) to (d) in FIG. 12 illustrate electron microscope photographs of the results of experiments where the workpiece was a mechanically polished Cu metal sheet (in place of the Cu film produced in the manner described above). 0.1 M $HClO_4$/0.05 M $CuSO_4$ was used as the electrolyte. The addition of $Cu^{2-}$ should facilitate the adjustment of the redox potential of $Cu/Cu^{2+}$ but it is not absolutely necessary. The bi-potentiostatic control system described with reference to FIG. 7 was also used in this case. The potentials were the same as those in the experiments whose results are illustrated in diagrams (a) and (b) in FIG. 8. In each case a total $10^9$ pulses in a 10 minute period were applied. The tool electrode, a wire of platinum (Pt) with a diameter of 50 µm, was lowered into the workpiece by slowly pushing forward the absolute position whilst locally removing the workpiece material. From time to time the working gap was flushed by withdrawing the tool electrode for a short time. This method can also be used to produce three-dimensional structures with sharp edges, defined bore bases and high aspect ratio, as clearly illustrated in the diagrams (a) to (d) in FIG. 10. In detail, the diagrams (a) and (b) illustrate in different enlargements the result when using 200 ns wide pulses. The diagram (c) illustrates the result when using 100 ns wide pulses and the diagram (d) illustrates for comparison purposes in a total photograph the results for various pulse widths of 50 ns, 100 ns (2 depressions) and 200 ns (from left to right). The forward feed rate can still be optimised, in that the distance between the tool and the workpiece is controlled in such a manner as described above with reference to FIG. 6. In other words, the distance-dependent charge reversal current peak of the electrode current would be measured using a peak detector and compared with a desired value. The working gap then always remains at an optimum value.

Figure 13:
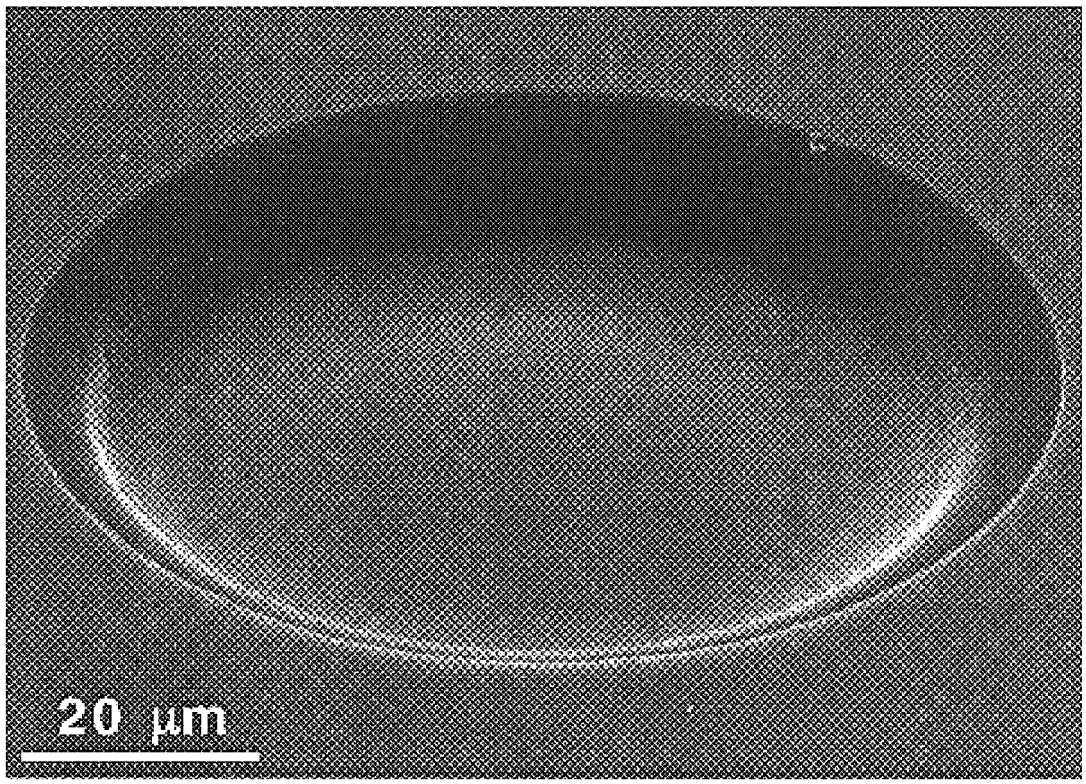
FIG. 13 shows in an electron-microscope photograph the result of etching a depression in p-silicon (111) using 400 ns wide pulses in an electrolyte which contains 1% HF in $H_2O/CH_3OH$ (50:50) and applying the bi-potentiostatic control system according to FIG. 7.

The method can in principle be used on all materials which can be etched electrochemically. It is thus possible to process doped silicon. In this case, the section of a suitable electrolyte in which the corresponding silicon can be oxidated electrochemically and also the precise potential control are essential. Highly doped—and p-silicon and normally doped p-silicon could be processed in 1% HF. The capacitance which is to charge reversed for the electrochemical process and the conductivity of the silicon are, however, after doping the silicon several sizes smaller than those of a metal. The lower capacitance means smaller typical charging time constants with otherwise identical parameters and thus reduced local resolution. The conductivity of the material must not be considerably lower than the conductivity of the electrolyte, as otherwise the distance dependency of the electrolyte resistance is irrelevant for the charge reversal of the double layer. Non-aqueous electrolytes could possibly be used. FIG. 13 illustrates in the electron microscope photograph a hole etched in a p-doped silicon (111) in 1% HF in $H_2O/CH_3OH$ (50:50), using the design described with reference to FIG. 7 with bi-potentiostatic control. The pulse width here amounts to 400 ns, the pulse amplitude war 0.5 V and a platinum wire was used as a tool electrode with a diameter of 50 µm.

Similar to the local removal of material (etching), the method in accordance with the invention can also be used for the local deposition of metal. It is also possible to use in an advantageous manner in this case the bi-potentiostatic control, as described above with reference to FIG. 7. In tests relating to this using the design illustrated in FIG. 7, the substrate (i.e. "workpiece") was a film of gold (Au) and the tool electrode a platinum (Pt) wire with a diameter of 50 µm. The electrolyte was 0.1 M $CuSO_4$/0.01 M $HClO_4$. The potential of the Au film was adjusted to approx. the $Cu/Cu^{2+}$ redox potential. As already mentioned above, when using this potential for the duration of the test no noticeable large area Cu deposition occurs. The tool electrode was positioned between 1 µm and 4 µm in front of the surface of the Au film. This was achieved by pulling back in a controlled manner the shifting table from the distance zero point which was measured by the occurrence of a tunnel current between the tool electrode and the workpiece. The potential of the tool electrode amounted to 500 nV in relation to the redox potential of $Cu/Cu^{2+}$.

Figure 14:
FIG. 14 shows in an electron-microscope photograph results of depositing copper from an electrolyte which contains 0.1 M $CuSO_4$ and 0.01 M $HClO_4$ on a gold substrate using 400 ns wide pulses and applying the bi-potentiostatic control system according to FIG. 7.

Pulses of 400 ns length, 2 V amplitude were applied between the workpiece and the tool electrode and in fact such that the workpiece was polarised by the pulses negative with respect to the tool electrode. The scanning ratio amounted to 1:100 in order to slow down the Cu deposition from the electrolyte and so as not to excessively deplete the electrolyte in the working gap during the deposition of Cu. After achieving a short circuit caused by the deposited Cu the tool electrode was removed and the pulses were switched off. FIG. 14 illustrates an electron microscope photograph which shows in the plan view the Cu locally deposited using the tool electrode as was produced in successive experiments using different distances between the workpiece and the tool electrode.

The method in accordance with the invention can in principle be used for all electrochemically active systems. An essential prerequisite for the etching is, in comparison to the material removal, the slow process of reverse deposition of removed material. Moreover, the surface must not become excessively passivated, which would lower the reaction rate to an unacceptable level. Both these prerequisites are fulfilled, for example for etching silicon in acidic, fluoride-containing electrolytes: the low pH-value prevents the passivation of the surface by forming oxides; the addition of fluoride ensures an only partially reversible Si-oxidation which prevents the reverse deposition of Si.

For the reverse reaction, i.e. the local deposition of material ionically dissolved in the electrolyte or even of material which is removed from the tool electrode during the reaction, an essential prerequisite is that the deposited structures remain stable in the presence of the rest voltage. This can be ensured by correspondingly dimensioning the rest voltage, as the test result illustrated in FIG. 14 shows. Furthermore, it is possible in certain cases that even with the rest potentials positive with respect to the Nernst potential of the metal, signs of etching, i.e. the decomposition of the structures, were inhibited. In actual fact, it was observed for extremely small Cu clusters on Au that these also remain stable above the Nernst potential. Also rest potentials lower than the Nernst potential are possible for specific systems. Frequently the metal deposition is inhibited by a nucleation barrier. Only during the voltage pulse is this barrier then locally exceeded. The metal deposition then takes place in these areas.

Figure 15:
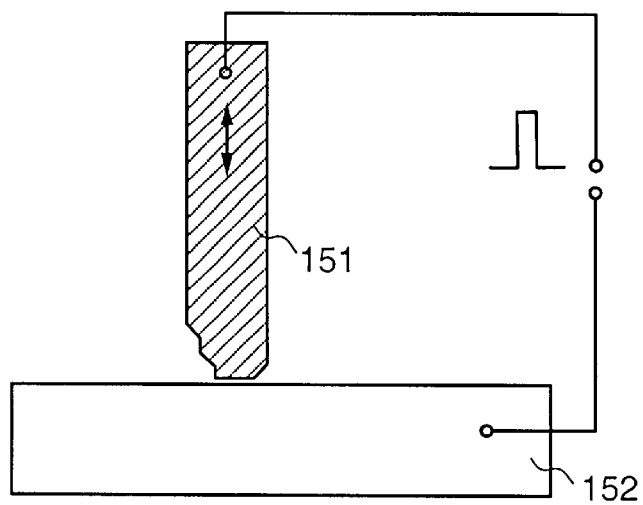
FIGS. 15, 16 and 17 illustrate some examples of electrode shapes for implementing the method in accordance with the invention.
Figure 16:
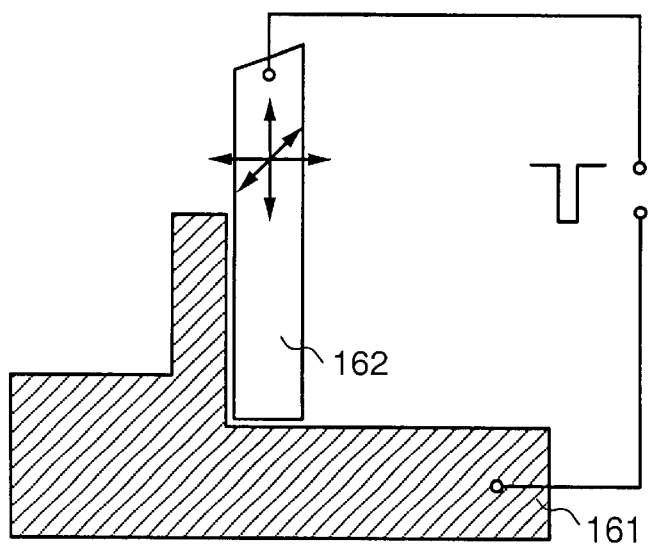
Figure 17:
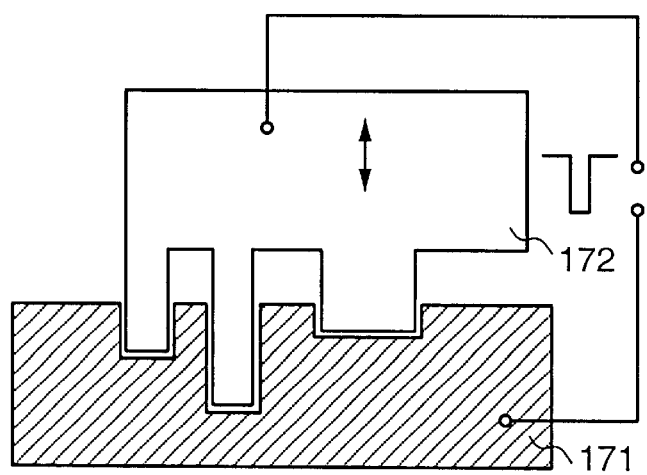

By selecting the electrode shape and/or by virtue of a one-, two- or three-dimensional relative movement between the workpiece and tool electrode according to a selected program, it is possible using the method in accordance with the invention to produce any structures with the smallest resolution, whether it be by means of electrochemically removing material or by electrochemical deposition. Some examples for possible electrode shapes for selective etching are illustrated schematically in FIGS. 15, 16 and 17. FIG. 15 illustrates once more the example discussed above, wherein a copper wire 151 with the aid of a flat tool electrode 152 was plated. FIG. 16 illustrates the three dimensional processing of a workpiece 161 with a tool electrode 162 which moves similar to a milling tool in three spatial directions. FIG. 17 illustrates a three-dimensional processing using the imprint of a die, wherein the end faces of discrete sections of a tool electrode 172 formed as a die are lowered in a workpiece 171. The polarity of the voltage pulse is in the case of all these examples, as illustrated, at the workpiece positive with respect to the tool electrode, which generally means material removal at the workpiece.

The feed rate can be controlled in all cases and in each spatial direction as in the case of the example described earlier via the amplitude of the electrode current peaks, for example by means of the control circuit illustrated in FIG. 6 (or FIG. 7). However, it is also possible to work with a constant feed rate; the reaction rate is then set in accordance with the working gap. The electrolyte in the working gap is possibly to be flushed from time to time by withdrawing the tool electrode for a short period of time.

The invention was explained above with reference to embodiments, wherein the applied voltage consists of a sequence of rectangular pulses over a defined rest level. The method in accordance with the invention is however not limited thereto, on the contrary, it can also be used successfully with other wave forms of a pulsating or alternating voltage. In general, without limitation to a specific wave form the instructions for the method in accordance with the invention are as follows:

i. the time mean of the applied voltage must have a value within the range of the system characteristic curve in which no noticeable reaction current flows;

ii. the deflections, measured relative to this mean value, of the applied voltage are to be dimensioned in their amplitude, their respective duration and their frequency in such a manner that the electrochemical double layer at least at the workpiece and there only in local areas, which do not lie further away from the tool electrode than a selected maximum distance $d_{max}$, is reverse charged between two charge voltages, of which at least one is sufficient to bring about the desired reaction;

iii. the shape of the space between the two electrodes is to be dimensioned such that only the points of the area to be processed lie within the said maximum distance $d_{max}$.

The dimensioning of the wave form of the applied voltage can partly be achieved with the aid of the system characteristic curve, i.e. the current/voltage curve of the electrode-electrolyte system which can be recorded for given electrode materials and electrolyte compositions under static conditions on a reference cell. With respect to FIG. 3 this means that the positive directed (i.e. going towards the right) deflections of the voltage must noticeably go beyond $U_{rkr}$. The mean value of the applied voltage must lie in the area left of $U_{rkr}$. Accordingly, the amplitude of the deflections going to the left, i.e. the opposite extreme value of the voltage, and the form and relative duration and frequencies of the deflections are to be measured (controllable, for example, via the repeat frequency, if the form and duration of one of the deflections are predetermined). Within these outline conditions the said parameters are to be adjusted so that the maximum distance $d_{max}$ for the sites of the desired double layer charge reversal is defined. In the case of rectangular pulses, the latter can be achieved using a computer according to the above mathematical equations (2) or (3) or else by means of an experiment observing the capacitive components of the electrode current.

If the wave form of the applied pulsating voltage does not contain any sharp pulse flanks, then there are no pronounced capacitive charge peaks of the electrode current during the double layer charge reversal. The capacitive component of the electrode current, which indicate the desired double layer charge reversal is taking place, is then expressed in a different kind of deformation of the charge current with respect to the voltage wave form. In the case of sinusoidal pulsation of the applied voltage, for example, the charge reversal results in the electrode current experiencing a phase displacement with respect to the voltage, wherein the extent of this displacement is an indication for the capacitive component.

It is thus possible, in order to verify the desired double layer charge reversal, to measure the capacitive component of the electrode current in general by virtue of comparing the wave form of the electrode current with that of the applied voltage, perhaps by linking by subtraction one of the signals corresponding to the applied voltage with the voltage which drops at a suitably calibrated current measuring resistance. In principle, any type of blind current measurement can be used to verify the double layer charge reversal. A correspondingly designed measuring device can also be used in the control circuit as shown in FIG. 6 in place of the peak detector 64 illustrated therein.

If the depletion of the charge carrier, which would prevent the double layer charge reversal, at any sites of the area to be processed is to be avoided, then the space between the electrodes at the area to be processed must not be too narrow anywhere. In this case a minimum limit $d_{min}$ is to be set for the electrode distance. The following information can be used as an aid for dimensioning this minimum limit: In order to charge reverse the double layer and to start the reaction approx. $\frac{1}{10}$ monolayer of monovalent ions from the electrolytes are deposited in the double layer. In the case of 1 M electrolyte, which contains for example KCl dissolved in $H_2O$, approx. every 50th particle is a salt ion of a charging site. For the purpose of adsorbing $\frac{1}{10}$ monolayer a removing agent film of approx. 5 removing agent molecular layers thick is thus completely depleted. In the case of $H_2O$ this corresponds to approx. 1.5 nm layer thickness. To avoid depletion it is therefore necessary for the minimum distance to be greater than this value. In general, it is sufficient to select for the minimum limit $d_{min}$ of the electrode distance a value in the magnitude of 1 nm. Such small distances can normally be set for example by means of withdrawing in a defined manner from the contact state, for example with piezo-electric adjusting elements after the tunnel current measuring process, as described above.

Special technical measures to maintain a minimum distance are, however, not necessary in every case. Especially when boring using an electrochemical process according to the method in accordance with the invention, as described above with reference to FIG. 17, it is possible to assume that, even when the workpiece and the tool electrode contact, only a few small points come into closer contact that the mentioned $d_{min}$. This is owing to the (on the atomic scale) rough nature of the electrode surface to be expected. Most of the tool electrode will always remain sufficiently far away from the tool surface to achieve the material removal whilst charge reversing the double layer in accordance with the invention. This naturally prerequisites corresponding high contact resistance between the workpiece and the tool. The current curve of the double layer charge reversal is then only insignificantly influenced by the few contact points. The tool electrode therefore lowers itself into the workpiece, wherein the material removal mainly occurs by virtue of the unhindered double layer charge reversal and possibly only the contact points are etched according to the previously published processing method mentioned above.

Tests with a workpiece made from p-silicon in 2% hydrofluoric acid with a Pt—Ir wire as the tool electrode have confirmed that the lowering actually functions under contact. Thus, the method in accordance with the invention can be used to etch structures of the smallest pattern in a workpiece surface, in that a correspondingly structured die can be easily lowered under a certain amount of contact pressure into the workpiece, until the desired etching depth is achieved. It is merely necessary to ensure that the contact pressure is sufficiently small to ensure a high contact resistance.

The method in accordance with the invention enriches the techniques of electrochemically processing material, which per se has the advantages of allowing shapes to be created without mechanical and thermal loading, without destroying the surface structure, without the risk of totally deforming small workpieces and mainly also without allowing the tools to wear. Thanks to the invention, the precision and the removing capability of electrochemical processing methods are improved. By shortening the pulse duration and reducing the electrolyte concentration the precision could be increased up to the level of standard lithographic methods. The lowering of a die illustrated in FIG. 17 also raises the possibility of simultaneously processing many workpieces or workpiece portions. This can be used to structure whole semi-conductor wafers. Lithography and the etching step can in this case be replaced by a processing step. Moreover, the lowering process is not dependent upon the crystallographic structure of the workpiece. The method in accordance with the invention therefore paves the way for the first time to actual three-dimensional processing when producing the smallest structures.

What is claimed is:

1. Method for processing a workpiece by means of a desired electrochemical reaction, comprising arranging at least a part of the workpiece which contains an area to be processed as a workpiece electrode within an electrolyte at a distance from a tool electrode and applying a pulsating or alternating electrical voltage between the two electrodes, wherein:

the applied voltage has a time mean value within a range of a system characteristic curve in which no noticeable reaction current flows;

deflections, measured relative to the mean value, of the applied voltage are dimensioned in their amplitude, their respective duration and their frequency such that an electrochemical double layer, at least at the workpiece and there only in areas which are no further away from the tool electrode than a selected maximum distance $d_{max}$, is charge reversed periodically between two charge voltages, of which at least one is sufficient to bring about the desired reaction; and the space between the two electrodes has a shape which is dimensioned such that only points of the area to be processed lie within the said maximum distance $d_{max}$.

2. Method according to claim 1, wherein the distance of each point of the area to be processed from the tool electrode lies within a range in which the electrode current has a clearly measurable capacitive component.

3. Method according to claim 2, wherein during the processing, a capacitive component of the electrode current is used as a control variable in a control circuit which controls the distance between the tool electrode and the workpiece.

4. Method according to claim 1, wherein the applied electrical voltage forms a sequence of pulses with a width $t_P$ and with a maximum voltage $U_P$, which renders possible the desired electrochemical reaction, over a rest level $U_O$, and variables $U_O$, $U_P$, and $t_P$, pulse frequency and the shape of the space between the tool electrode and the workpiece are dimensioned in such a manner that the distance d of each point of the area to be processed lies at a distance from the tool electrode surface is within a range in which the electrode current clearly indicates measurable capacitive charging and reverse charging peaks.

5. Method according to claim 1, wherein the applied electrical voltage forms a sequence of pulses with a width $t_P$ and with a maximum voltage $U_P$, which renders possible the desired electrochemical reaction, over a rest level $U_O$, and variables $U_O$, $U_P$, and $t_P$ and the specific resistance r of the electrolyte are dimensioned such that the following condition is created:

$$U_O+(U_P-U_O)\cdot(1-\exp[-t_P/(r\cdot c\cdot d_{max})])=U_{rkt}$$

where c=electrical capacitance per area unit of the double layers in series, and $U_{rkt}$=threshold voltage between the electrodes, above which a noticeable material-processing electrochemical reaction takes place.

6. Method according to claim 1, wherein the applied electrical voltage forms a sequence of pulses with width $t_P$ and with a maximum voltage $U_P$, which renders possible the desired electrochemical reaction, over a rest level $U_O$, $U_P-U_O$ is less than twice as high as a minimum level above which a noticeable material-processing electrochemical reaction occurs, and $t_P$ and the specific resistance r of the electrolyte are dimensioned such that $$t_P \approx r\cdot c\cdot d_{max}$$

where c=electrical capacitance per area unit of the double layers in series.

7. Method according to claim 4 wherein the voltage pulses are substantially rectangular in shape.

8. Method according to claim 4 wherein during the processing the peak amplitude of the charging current of the double layer is used as a control variable in a control circuit which controls the distance between the tool electrode and the workpiece.

9. Method according to claim 1 wherein the applied voltage has a sinusoidal curve.

10. Method according to claim 1, wherein a rest level to be set between the deflections of the applied voltage is held by means of a potentiostatic control at a value at which the desired reaction does not noticeably occur.

11. Method according to claim 10, wherein both the electrochemical potential of the workpiece electrode and also the electrochemical potential of the tool electrode with respect to a reference electrode located in the electrolyte are adjusted by way of a counter electrode located in the electrolyte to the desired values in a bi-potentiostatic manner by means of a control system with a low-pass filter behavior, at which desired values the desired reaction does not noticeably occur at the workpiece electrode and side reactions are sufficiently prevented at the tool electrode.

12. Method according to claim 1, wherein the workpiece to be processed is a material which was deposited from the electrolyte used during processing prior to applying the voltage which effects the processing.

13. Method according to claim 1 additionally comprising dimensioning the shape of the space between the electrodes such that a minimum distance of more than 1 nm is maintained between the area to be processed and the tool electrode.

14. An apparatus for processing a workpiece by means of a desired electrochemical reaction, said apparatus comprising:

feed means for maintaining at least a part of the workpiece which contains an area to be processed as a workpiece electrode within an electrolyte at a controllable distance from a tool electrode and for imparting relative movement between the two electrodes in a desired feed direction of processing within the electrolyte;

the tool electrode being shaped to establish a space between the two electrodes, the shape of said space being dimensioned such that only points of the area to be processed lie within a selected maximum distance $d_{max}$;

means for applying a pulsating or alternating electrical processing voltage between the two electrodes;

means for adjusting time mean value of the processing voltage to a value within a range of a system characteristic curve in which the desired electrochemical reaction does not noticeably occur; and means for adjusting deflections, measured relative to said mean value, of the processing voltage in amplitude, respective duration and frequency such that an electrochemical double layer, at least at the workpiece and there only in areas which are not further away from the tool electrode than the selected maximum distance $d_{max}$ is charge reversed periodically between two charge voltages, of which at least one is sufficient to bring about the desired reaction.

15. The apparatus according to claim 14, further including a feed control loop comprising:

means for measuring a control variable which is representative of a capacitive component of the electrode current caused by the processing voltage; and adjusting means for influencing the feed means so as to keep the measured control variable at a selected desired value.

16. The apparatus according to claim 15, wherein the measuring means of the feed control loop comprises a peak detector which is adapted to sense positive or negative peak amplitude of the electrode current as said control variable or to sense peak-to-peak amplitude of the electrode current as said control variable.

17. The apparatus according to claim 14, wherein the means for adjusting the time mean value of the processing voltage comprises a potentiostatic control system for keeping a rest level of the processing voltage between the deflections at a value at which the desired electrochemical reaction does not noticeably occur.

18. The apparatus according to claim 17, wherein the potentiostatic control system includes:

a reference electrode and a counter electrode, both arranged to be located within the electrolyte;

a first control loop with a low-pass filter behavior for adjusting the electrochemical potential of the workpiece electrode with respect to the reference electrode in a bi-potentiostatic manner by way of the counter electrode to a desired value at which the desired electrochemical reaction does not noticeably occur at the workpiece electrode; and a second control loop with a low-pass filter behavior for adjusting the electrochemical potential of the tool electrode with respect to the reference electrode in a bi-potentiostatic manner by way of the counter electrode to a desired value at which side reactions are sufficiently prevented at the tool electrode.

* * * * *